Patented Apr. 23, 1946

2,399,150

UNITED STATES PATENT OFFICE 2,399,150

ATTACHMENT FOR VEHICLE CLUTCH PEDALS

Edward J. Snider, Hudson, Iowa

Application November 11, 1944, Serial No. 563,026

5 Claims. (Cl. 74—481)

This invention relates generally to tractor clutch devices and in particular to a hand operated attachment for a tractor clutch pedal adapted to move the tractor clutch pedal to positions providing for the tractor clutch being thrown in and thrown out, and to releasably hold the clutch pedal in a moved position.

Tractors in common use for farm work are generally provided only with a clutch pedal for throwing the tractor clutch in and out. This results in considerable inconvenience to the tractor operator in driving the tractor through gated openings, connecting the tractor with farm implements to be drawn, and operating the tractor for belt work, such as in threshing, silage cutting, etc., or in conjunction with a binder.

In driving the usual tractor through a gated opening the operator must first throw out the clutch and then move the tractor shift lever to neutral before dismounting to open the gate. Before driving through the gate the clutch is thrown out, the shift lever operated and then the clutch is thrown in again. After the tractor is through the gate all of the above procedures are repeated before the operator can close the gate and drive on. As a result appreciable time is required to pass through a gated opening.

Another disadvantage in having only the common clutch pedal on the tractor is found in the fact that when the shoe of the operator is slippery or wet it readily slips off of the clutch pedal. This is particularly dangerous when the tractor is being backed up for connection to a farm implement, since a slipping of the operator's foot may result in backing the tractor into the implement or in the injury to a second person who may be making the connection of the tractor with the implement.

A further objection to only a clutch pedal on a tractor is found in its being an appreciable distance from the operator's feet and the relatively large amount of effort which must be foot applied to throw the clutch out. Short persons are thus at a disadvantage in operating the tractor because of their inability to easily reach the clutch pedal. Small boys not only encounter this same disadvantage but further require substantially all of their strength to push the clutch pedal in. As a result they are unable to be used for tractor work which they could do except for operating the clutch pedal.

For belt work the usual tractor requires that the operator mount the tractor and operate the tractor shift lever in connection with the clutch pedal each time the power take-off is to be started or stopped. It is readily apparent that where emergency stops are required the time thus taken by the operator to mount the tractor may result in serious injury to equipment or to persons operating the belted equipment.

It is an object of this invention, therefore, to provide an improved clutch device for a tractor.

A further object of this invention is to provide a tractor clutch device which can be easily and quickly operated by the tractor operator or by a person remotely located from the tractor.

Yet another object of this invention is to provide a tractor clutch pedal attachment adapted to automatically move a clutch pedal to clutch throw-in or throw-out positions, and to releasably but positively hold the clutch pedal in positions providing for the clutch being thrown in or thrown out.

An important object of this invention is to provide a tractor clutch pedal attachment in which the manual pressure required to throw the clutch in or out is less than the effective pressure applied on the clutch pedal to normally move and hold the clutch pedal in a moved position.

A feature of this invention is found in the provision of a hand-operated attachment for a tractor clutch pedal which is adapted to move and hold the clutch pedal in a clutch in and out position. A spring member in the attachment is assembled with the clutch pedal such that when the clutch is thrown in energy is stored in the spring, which energy is released when the clutch is thrown out so as to counteract the pressure normally applied on the clutch pedal to hold it in a clutch throw-in position.

Further objects, features and advantages of this invention will become apparent from the following description when taken in connection with the accompanying drawing in which:

Fig. 1 is a side elevation of the rear portion of a tractor showing the tractor clutch pedal in assembly relation with the tractor clutch pedal attachment of this invention;

Fig. 2 is a sectional view taken on the line 2—2 in Fig. 1;

Fig. 3 is a fragmentary side elevation of the tractor clutch pedal attachment showing parts in changed positions relative to their showing in Fig. 1; and Fig. 4 is a fragmentary rear perspective view of a detail of the clutch pedal attachment of this invention.

With reference to Figs. 1, 2 and 3 of the drawing there is shown a rear portion of a tractor, including a side frame member 5, an engine 6, a clutch housing 7, a transmission housing 8 and a rear axle 9 operatively associated with the clutch mechanism in the housing 7. A usual shift lever is indicated at 11. The clutch mechanism within the housing 7 includes a rock shaft 12 having one end projected from the housing 7 toward the side frame member 5. This projected end of the shaft 12 carries a rock arm 13 which has its free end connected by an adjustable link 14 to a downward extension 16 on a pivoted clutch pedal 17 which is pivoted at 18 on a bracket 19 supported on the frame member 5.

On the application of a foot pressure on the pedal 17 it is moved to the position shown in Fig. 1 whereby the link 14 is moved rearwardly to in turn rock the shaft 12 in a counterclockwise direction, as also viewed in Fig. 1, to throw out the clutch mechanism, whereby the engine 6 is disengaged from a driving relation with the rear axle 9. When the foot pressure is released from the clutch pedal 17, it is automatically moved to its position shown in Fig. 3, by a yieldable pressure means usually associated with the clutch mechanism. It is seen, therefore, that the clutch is thrown out by the manual moving of the pedal to its unclutching position shown in Fig. 1, and is thrown in by the automatic return of the clutch pedal to its clutching position shown in Fig. 3 in response to a yieldable pressure in the clutch mechanism acting on the shaft 12 to rotate it in a clockwise direction as viewed in Figs. 1 and 3. The structure thus far described is well known and applies specifically to a tractor of the "Farmall" type.

The clutch pedal attachment of this invention comprises an upright bracket or frame 18a having a front brace member 19a and secured to the outside of the frame member 5 rearwardly of the clutch pedal 17 by bolts 20 extended through the frame member 5. A hand lever 21 is pivoted intermediate its ends at 22 to the upper end of the frame 18a. A link 23, which extends in a forward and rearward direction, has a U-shaped rear end arranged in a straddling relation with the lever 21 and pivotally connected with the lever 21 by pivot means 24 at a position below the pivot 22. The front end of the link 23 is pivotally connected at 26 adjacent the rear end of a bracket 27 carried on the clutch pedal 17 adjacent its upper end.

The bracket 27 (Figs. 1, 2 and 4) is of an irregular shape and is comprised of a flat base or body member 28 integrally formed with a side member 29 and a recessed portion 31 at its end 32. An extension 33 for the side member 29 is projected at an angle outwardly from the end 34 of the base member 28. The base member 28, adjacent its side opposite from the side member 29, is provided with longitudinally spaced pairs of openings 36, with each pair adapted to receive the legs of a U-clamp 37.

In the assembly of the bracket 27 with the clutch pedal 17 the bracket is arranged such that the base 28 is against the shank of the pedal and with the extension 33 projected toward the front end of the tractor (Figs. 1 and 2). The U-clamps 37 are positioned about the shank of the pedal 17 and extended through the openings 36 with the bracket being retained on the pedal by the threading of nuts 30 on the free ends of the clamps 37. The front end of the link 23 is pivoted by the pivot bolt 26 to the rear end of the side member 29, with the inner end of the bolt 26 being extended within the recess 31 of the bracket member 27, as best appears in Fig. 4. Thus as shown in Figs. 1 and 3 the link 23 is extended rearwardly and upwardly from the upper end of the clutch pedal 17 to its pivot connection 24 with the lever 21.

A coil spring 38 has its front end 39 adjustably connected to a laterally extended lug 41 on the front end of the extension 33 of the bracket 27. The rear end of the spring is connected at 40 to the lower end of the lever 21 in a downwardly spaced relation from the pivot 24 for the rear end of the link 23. The spring is thus extended downwardly and rearwardly from the lug 41 to its connection at 40 with the lower end of the lever 21.

In the operation of the clutch pedal attachment assume that the hand lever 21 is in its position shown in Fig. 1 corresponding to the clutch being thrown out to provide for a disconnection of the engine 6 with the rear axle 9. With the lever 21 in this position the spring 38 is in a contracted or released condition so that it has a length indicated by the letter $a$ in Figs. 1 and 3, and is in a position such that its longitudinal axis or center line of pressure application is below the pivot 26 for the front end of the link 23.

To throw the clutch in the lever 21 is pivotally moved to its position shown in Fig. 3. During the movement of the lever 21 from its position shown in Fig. 1 to its position shown in Fig. 3 the spring 38 is extended to a length indicated by the letter $b$ in Fig. 3, whereby energy is stored or built up in the spring 38. Concurrently with a storing of energy in the spring it is moved to a position with its longitudinal axis above the pivot 26 for the front end of the link 23.

In the operation of the clutch pedal 17, without the attachment of this invention, the usual pressure plates or like spring acting means in the clutch mechanism, act alone to yieldably move and hold the pedal 17 in a clutch throw-in position, so that the full spring action of the pressure plates must be manually overcome to move and hold the pedal 17 in a clutch throw out position.

When the attachment of this invention is used the spring 38 is extended, as the pedal 17 is moved to a clutch throw in position, by the combined action of the clutch pressure plates and a manual force applied on the lever 21. The pressure thus stored in the spring 38 is released against the action of the clutch pressure plates, when the lever 21 is manually operated to move the pedal 17 to a clutch throw out position.

Thus the spring 38, during the movement of the pedal 17, always acts in opposition or counter to the force applied on the clutch pedal 17 by the clutch pressure plates, so that the spring 38 complements the manual force applied on the lever 21 to move the pedal 17 to a clutch throw out position, while the clutch pressure plates complement the manual force applied on the lever 21 to move the pedal 17 to a clutch throw in position against the action of the spring 38. At no time, therefore, is the pedal 17 operated by a manual force alone.

With the longitudinal axis of the spring 38 above the pivot 26 for the front end of the link 23, the spring 38 acts to move the clutch pedal 17 in a rearward direction, or toward the right as viewed in Fig. 3, so as to releasably hold the pedal in a clutch throw-in or engaged position. It is apparent, of course, that this holding action of the spring 38 is aided by the normal pressure in the clutch mechanism for automatically returning and retaining the clutch in a clutch throw-in position. The rearward movement of the clutch pedal 17, in response to the joint action of the spring 38 and the pressure in the clutch mechanism, is limited by the engagement of the pedal with the forward side 42 of the pedal supporting bracket 19.

The pedal 17 is releasably held in a clutch throw-out position by virtue of the fact that the longitudinal axis of the spring 38 is below the pivot 26 for the front end of the link 23, and in a released condition. Before the clutch pedal 17 can be moved from a clutch throw-out position a force must be applied thereon capable of extending the spring 38. This extension of the spring takes place due to the increase in the angle between the link 23 and the lever 21, indicated as c in Fig. 1, and the resulting increased distance between the pivot 26 and the connection 40 of the rear end of the spring 38 with the lever 21.

As previously mentioned the movement of the clutch pedal 17 to clutch throw-in and throw-out positions takes place automatically on movement of the longitudinal axis of the spring 38 to one side or the other of the pivot 26 for the front end of the link 23. Movement of the clutch pedal 17 is thus readily capable of being remotely controlled by attaching a cable, rope or the like to the upper end of the lever 21 for pulling the lever in opposite directions. When the tractor is used for belt work the control ends of the cable may be located at either the front or the back of the tractor so as to be readily accessible to a person attending the equipment which is being operated by the tractor. Where the tractor is used in conjunction with a binder having equipment by which the tractor can be steered from the binder the control ends of the cable may be extended to a position convenient for accessibility by the binder operator.

When a tractor equipped with the attachment of this invention is to be driven through a gated opening the operator need only actuate the lever 21 to move the clutch pedal 17 to a clutch throw-out position without manipulating the shift lever 11. On his return to the tractor to drive it through the gate it is only necessary to actuate the lever 21 to move the clutch pedal 17 to a clutch throw-in position, since the tractor is already in gear. Appreciable time is thus saved while eliminating any potential hazard of the tractor slipping into gear while the gate is being moved.

From a consideration of the above description it is seen that the invention provides an attachment for a tractor clutch pedal which is of a simple construction, easily and quickly applied to commercially available tractors, and adapted to releasably but positively hold the clutch pedal in clutch throw-in and clutch throw-out positions. Further the actuating lever of the attachment is arranged in a position adjacent to the tractor seat so that a complete operation of the tractor can be easily accomplished without requiring any foot operation of the tractor clutch pedal.

The invention provides further for the moving of the tractor clutch pedal with a minimum of manual effort by virtue of the counteraction of the spring 38 and the normal action of the tractor clutch relative to the pedal 17. It is to be understood, of course, that the manual pressure required to move the lever 21 can be changed by varying the pressure of the spring 38 and the arrangement of the pivots in the leverage system comprising the lever 21, link 23, pedal 17 and the spring 38. However, the invention contemplates that this arrangement be such that the manual pressure required to actuate the lever 21 is always less than the effective pressure exerted counter to the movement of the lever 21 by either the spring 38 or the pressure applied on the clutch pedal 17 by the tractor clutch.

Although the invention has been described with respect to a preferred embodiment thereof it is to be understood that it is not to be so limited since modifications and changes can be made therein which are within the full intended scope of this invention as defined by the appended claims.

I claim:

1. In combination with a pivoted clutch pedal normally yieldably moved and maintained in a clutch-connecting position, means for releasably maintaining said clutch pedal in a clutch-disconnecting position comprising supporting means arranged rearwardly of said clutch pedal, a hand lever pivotally supported on said supporting means, a link pivoted at one end adjacent the upper end of said clutch pedal and at its opposite end to said lever at a position spaced upwardly from the lower end of said lever, a coil spring connected at one end adjacent to the lower end of said lever and at its other end adjacent to the upper end of said pedal, said lever, on pivotal movement in one direction, providing for the contraction of said spring and, on pivotal movement in an opposite direction, for the storage of energy in said spring.

2. In combination with a pivoted clutch pedal normally movable to a clutching position, means for moving and releasably holding said clutch pedal in an unclutching position including a pivoted hand lever, a link pivoted at one end to said pedal and at its opposite end to said lever, and a spring having one end connected to said clutch pedal and its other end connected to said lever, said spring being released when said clutch pedal is in an unclutching position, and having energy stored therein when the clutch pedal is in a clutching position.

3. The combination with a pivoted clutch pedal manually movable to an unclutching position, and having means for providing a pressure thereon which acts to move and hold the clutch pedal in a clutching position, of means providing for the releasable holding of said clutch pedal in said two positions comprising an upright support located rearwardly of said clutch pedal, an operating lever pivoted on said support, a link member pivoted at one end on said pedal and extended upwardly and rearwardly for pivotal connection at its other end on said operating lever, a coil spring having one end connected to said pedal and its opposite end connected with said operating lever at a position below the pivoted connection of the other end of said link, with the pivoted movement of said lever in one direction being aided by the pressure acting on said pedal, to extend and store energy in the spring, and said stored energy being released to aid the movement of said lever in an opposite direction against said pressure.

4. In combination with a pivoted clutch pedal normally held by a yieldable pressure in a clutching position, of means utilizing a portion of said pressure to move said clutch pedal to an unclutching position and to releasably hold said clutch pedal in said two positions, comprising an upright frame located rearwardly of said pivoted clutch pedal, a manually operated lever pivoted adjacent the upper end of said frame and above the upper end of said clutch pedal, a rearwardly and upwardly extended link, pivot means pivotally connecting the forward end of said link adjacent to the upper end of said clutch pedal, with the rear end of said link being pivotally connected with said lever, a rearwardly and downwardly extended coil spring connected at one end adjacent to the upper end of said pedal and at its other end to said lever, said spring, on pivotal movement of said lever in one direction, to move said clutch pedal to said clutching position, being extended and having energy stored therein, and on movement of said lever in an opposite direction, to move said pedal to said unclutching position, having the stored energy therein released to act on said clutch pedal counter to said yieldable pressure.

5. The combination with a pivoted clutch pedal normally yieldably retained in a clutching position and manually movable to an unclutching position, of means for releasably holding said clutch pedal in said two positions comprising an upright frame located rearwardly of said clutch pedal, an upright pivoted lever, a first pivot means connecting said lever intermediate its ends on said frame for rearward and forward pivotal movement, with said first pivot means being located above the upper end of said clutch pedal, a link pivotally connected at its rear end to said lever below said first pivot means, second pivot means pivotally connecting the forward end of said link adjacent to the upper end of said pedal, and a coil spring connected at one end to said pedal and at its opposite end to said lever below the rear end pivotal connection of said link, said spring being extended, on pivotal movement of said lever in one direction to move said clutch pedal to its clutching position, and released, on movement of said lever in an opposite direction to move the clutch pedal to its unclutching position.

EDWARD J. SNIDER.